United States Patent [19]

Boutevin et al.

[11] Patent Number: 5,315,031
[45] Date of Patent: May 24, 1994

[54] OLIGOMERS WITH POLYDIENE SEQUENCES AND PHOTOCROSSLINKABLE GRAFTS AND THEIR APPLICATION PARTICULARLY IN COATING METALS

[75] Inventors: Bernard Boutevin; Etienne Fleury; Jean-Pierre Parisi, all of Montpellier, France

[73] Assignee: Atochem, Puteaux, France

[21] Appl. No.: 772,714

[22] Filed: Oct. 7, 1991

Related U.S. Application Data

[63] Continuation of Ser. No. 462,852, Jan. 4, 1990, abandoned, which is a continuation of Ser. No. 21,945, Mar. 5, 1987, abandoned.

[30] Foreign Application Priority Data

Mar. 5, 1986 [FR] France ................................ 86 03617

[51] Int. Cl.$^5$ ........................................... C07C 321/18
[52] U.S. Cl. .................... 560/154; 560/153; 558/438; 558/439; 562/556; 562/594
[58] Field of Search ................ 562/594, 556; 560/154, 560/153; 558/438, 439

[56] References Cited

U.S. PATENT DOCUMENTS 3,378,516  4/1968  Tholstrup et al. .............. 560/154 X
3,839,405  10/1974  Dannals ........................ 562/594 X

*Primary Examiner*—Joseph Paul Brust
*Attorney, Agent, or Firm*—Browdy and Neimark

[57] ABSTRACT

Oligomers with polydiene sequences and crosslinkable grafts are useful as coatings for protecting metal surfaces as well as inking buffers. The oligomers contain a polydiene sequence of 1-100 diene links, from 1 to 20 polar functional groups, and from 1-20 acrylic or methacrylic groups. The oligomers have the general formula:

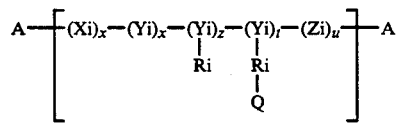

8 Claims, No Drawings

OLIGOMERS WITH POLYDIENE SEQUENCES AND PHOTOCROSSLINKABLE GRAFTS AND THEIR APPLICATION PARTICULARLY IN COATING METALS

CROSS-REFERENCE TO RELATED APPLICATIONS

This is a continuation of application Ser. No. 07/462,852, filed Jan. 4, 1990, now abandoned, which was a continuation of application Ser. No. 07/021,945, filed Mar. 5, 1987, now abandoned.

FIELD OF THE INVENTION

The present invention relates to oligomers with polydiene sequences and crosslinkable grafts and their applications particularly for protective coatings for metals.

BACKGROUND OF THE INVENTION

Of the numerous photocrosslinkable oligomers, acrylic epoxys and acrylic urethanes are now the most commonly used.

More recently, acrylic telomers obtained either by redox catalysis (as disclosed in French application FR-A-81 14 799) or by free radical initiating (as disclosed in French application FR-A-88 06 066) have been proposed. In any case, these oligomers are used in admixture with an acrylic reactive diluting monomer either in the presence of photoinitiators in the case of UV crosslinking, or directly, when electrons are used.

The setting times are very short, on the order of a second. This implies a high functionality in acrylic groups, which results in a great density of crosslinking nodes manifested by considerable shrinkages and stresses and a lack of adherence and flexibility, these phenomena probably being related.

Several solutions have been proposed, particularly the introduction of flexible sequences separating the acrylic groups. In the case of diacrylate silicones, the silicone sequence contributes the flexibility, and in the case of diacrylate polybutadienes, the butadiene sequence performs this role. Diol telecholic polybutadienes, with a flexible polybutadiene chain, are then involved, the grafting of the acrylics being performed on the diol ends.

Other proposed solutions consist of introducing groups promoting adherence to certain supports, such as acrylic grafted cellulose and acrylic phosphoric ester type adherence promoters.

SUMMARY OF THE INVENTION

The object of the invention is to propose new types of photocrosslinkable oligomers combining properties of flexibility, adhesion and crosslinking speed.

These new types of photocrosslinkable oligomers contain a polydiene sequence of from 1 to 100 isoprene, butadiene, chloroprene links, from 1 to 20 polar functional groups such as acid or alcohol groups, and from 1 to 20 acrylic or methacrylic groups, the three types of groups being linked by covalent bonds.

The general formula of the compounds according to the invention is the following

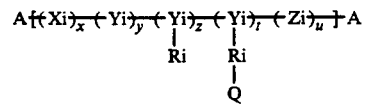

in which:

$Xi$ represents a diene monomer polymerized according to a cis or trans, 1–4 chaining, such as isoprene, butadiene or chloroprene;

$Yi$ represents a diene monomer polymerized according to a 1–2 or 3–4 chaining, such as isoprene, butadiene or chloroprene;

$Zi$ represents an acrylic, vinylic or allylic nondiene polymerizable monomer;

$Ri$ represents a thio-containing group added onto the unpolymerized double bond of the diene $Yi$ and further having, on its chain, one or more groups onto which acrylics or methacrylics Q can be grafted;

Q represents an acid or ester acrylic or methacrylic derivative comprising a function complementary to that of the $Ri$ group, to perform the grafting;

A represents end groups of the polymerization, provided by the initiator.

The length of the chains are such that liquid oligomers or those with relatively low viscosity are obtained, which exhibit a good solubility in standard diluents.

Thus:

$x+y+z+t+u$ is less than or equal to 100 z, t, u, being less than or equal to 20, which makes it possible to retain the properties of flexibility due to x, of adhesion due to z and of crosslinking speed due to t.

It should be noted that the presence of $Zi$ is linked to the use of commercial copolymers containing this radical but should not harm the flexibility properties of the material.

Obtaining oligomers of formula I according to the invention requires three stages:

The first stage consists of polymerizing or copolymerizing a diene $Xi$ (optionally with $Zi$) in the presence of molecules generating ends A.

This stage is optional when commercial products are used such as hydroxytelechelic or carboxytelechelic polybutadienes (HTPB) or (CTPB).

In this stage, molecules of structure II are obtained:

The second stage consists of performing the addition of a thio-containing-group by a free radical or photochemical method, to lead to the creation of a thioether bond. This thio-containing group further comprises one or more polar functions, which can be left free, or which can react in the third stage. At the end of this second reaction, molecules of structure (III) are obtained:

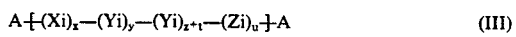

It should be noted that the chain units $(Yi)_y$ correspond to chain units $(Yi)$ on which the addition of thio-containing group has not been performed.

The third stage consists of grafting acrylic or methacrylic derivatives onto Ri groups chemically (by addition or condensation). The choice of the compounds Q flows from the residual groups of preceding Ri thio-containing groups.

Formula I is then reached:

$$A\!-\!\!\left[\!(Xi)_x\!-\!(Yi)_y\!-\!(Yi)_z\!-\!(Yi)_t\!-\!(Zi)_u\!\right]\!\!-\!A \qquad (I)$$
$$\quad\quad\;|\quad\;\;\;|$$
$$\quad\;\;Ri\quad\;Ri$$

To facilitate a better understanding of the invention, the various above stages will now be described in a detailed way.

First Stage:

When the diene is selected from telechelic polybutadienes obtained by the free radical or ionic method, varied groups are found at the chain ends, but the main ones for commercial use are diols and diacids.

It should be recalled that this first stage does not constitute the originality of the invention.

At the end of this stage, it is essential to obtain liquid oligomers with a relatively high 1-2 chaining rate. A percentage of 20 to 30% appears to be a good compromise and is often obtained by free radical polymerization. There are also telechelic polybutadienes with 90% chaining levels marketed particularly under the name NISSO C 1000 by NIPPON SODA and 58% marketed under the name NISSEKI B 1000 by NIPPON PETROCH.

Second Stage:

The addition of thio-containing groups to the polymers of butadiene or isoprene, or their copolymers, can be accomplished by free radical and photochemical methods.

On the other hand, few researchers are interested in the modification of telechelic polybutadienes by this type of method. However, PASCAULT et al. for a long time have studied the synthesis, transformation and characterization of diene oligomers. (CAMBERLIN Y. European Polymer Journal (16) 1031-1036 (1980); DE LA CAMPA J.G. Makromol. Chem. (182) 1415-1428) (1981); LALEG M. European Polymer Journal (18) 821-829 (1982). More particularly they considered the addition of various types of thio-containing compounds:

thiopropionic acid
n-butyl mercaptan
2,2-dimethylpropane thiol
4-methyl thiophenol According to the invention, three broadly defined types of thio-containing compounds are added to these diene supports:

thioglycolic acid
2-mercapto ethanol
2-mercapto ethanol amine.

It is possible to use any molecules having a thio or disulfide group, and in the chain or on the end, amine, alcohol, or acid groups.

There can be cited among others: thiopropionic acid, thiomatic acid, or cysteine.

On a carboxytelechelic polybutadiene having 20% of 1-2 unsaturated groups, analyzed by proton nuclear magnetic resonance, the inventors added thioglycolic acid by operating on the ratio thio/1-2 dl, to regulate the addition rate. The reactions took place in 70° tetrahydrofuran while using azobisisobutyronitrile as initiator or by UV photochemical initiation with benzophenone.

It was found that to obtain a 50% addition rate, a ratio close to 1 was necessary, whereas a ratio of 2 led to 90% addition. Proton NMR made it possible to measure this addition rate of thio-containing group.

Third stage:

Taking into account the above-mentioned amine, alcohol, acid or other groups, grafting of acrylic or methacrylic derivatives is accomplished by condensation, either with acrylic or methacrylic acid, or with glycidyl acrylate or glycidyl methacrylate, or with an aziridinyl acrylate or methacrylate; these reactions are the following:

thio amine with glycidyl methacrylate $$RiNH_2 + CH_2\!\!-\!\!\underset{O}{\overset{\diagdown\;\;\diagup}{CH}}\!\!-\!\!CH_2\!-\!O\!-\!\underset{\underset{O}{\|}}{C}\!-\!\underset{CH_3}{\overset{|}{C}}\!=\!CH_2 \longrightarrow$$

$$RiNH\!-\!CH_2\!-\!\underset{OH}{\overset{|}{CH}}\!-\!CH_2\!-\!O\!-\!\underset{\underset{O}{\|}}{C}\!-\!\underset{CH_3}{\overset{|}{C}}\!=\!CH_2$$

thio alcohol with methacrylic acid $$Ri\!-\!OH + CH_2\!=\!C\!\!\begin{array}{c}\diagup CH_3\\ \diagdown CO_2\end{array} \longrightarrow$$

$$Ri\!-\!O\!-\!\underset{\underset{O}{\|}}{C}\!-\!\underset{CH_3}{\overset{|}{C}}\!=\!CH_2$$

thio acid with glycidyl methacrylate $$Ri\!-\!CO_2H + CH_2\!\!-\!\!\underset{O}{\overset{\diagdown\;\;\diagup}{CH}}\!\!-\!\!CH_2O\!-\!\underset{\underset{O}{\|}}{C}\!-\!\underset{CH_3}{\overset{|}{C}}\!-\!CH_2 \longrightarrow$$

$$Ri\!-\!\underset{\underset{O}{\|}}{C}\!-\!O\!-\!CH_2\!-\!\underset{OH}{\overset{|}{CH}}\!-\!CH_2\!-\!O\!-\!\underset{\underset{O}{\|}}{C}\!-\!\underset{CH_3}{\overset{|}{C}}\!=\!CH_2$$

thio acid with aziridinyl methacrylate $$Ri\!-\!CO_2H + \underset{H_2C}{\overset{CH_2}{\diagup\!\!\diagdown}}\!\!N\!-\!(CH_2)_2\!-\!O\!-\!\underset{\underset{O}{\|}}{C}\!-\!\underset{CH_3}{\overset{|}{C}}\!=\!CH_2 \longrightarrow$$

$$Ri\!-\!\underset{\underset{O}{\|}}{C}\!-\!O\!-\!(CH_2)_2\!-\!CH\!-\!(CH_2)_2\!-\!O\!-\!\underset{\underset{O}{\|}}{C}\!-\!\underset{CH_3}{\overset{|}{C}}\!=\!CH_2$$

Of the grafts used, there can be cited:

when the thio-containing groups has one or more acid residual functions: acrylates, methacrylates, cinnamate, cinnamylidene, furlyacrylate, glycidyl allylate, allyl or glycidyl ether, 2-(1-aziridinyl)ethyl acrylate and methacrylate, 3-(1-aziridinyl)propyl acrylate and methacrylate, 4-(1-aziridinyl)butyl acrylate and methacrylate, 6-(1-aziridinyl)hexyl acrylate and methacrylate, 8-(1-aziridinyl)octyl acrylate and methacrylate.

When the thio-containing has one or more amine functions: glycidyl acrylate or methacrylate, glycidyl allylate, cinnamate, cinnamylidene, glycidyl furylacrylate.

When the thio-containing has one or more alcohol functions: acrylic, methacrylic, cinnamic, cinnamylidic, furylacrylic acids.

The most widely used grafting method consists of adding acrylic epoxy derivatives onto polybutadienes modified by thioglycolic acid in the presence of tertiary amine type catalysts.

This reaction is performed with the aid of a catalyst, N,N dimethyl laurylamine at 60° C., in tetrahydrofuran and inactinic glassware. The relatively low temperature avoids any early crosslinking between the grafts but still permits a rather fast grafting speed to be attained.

The acid-epoxy reaction is more economical and, on the other hand, exhibits synthesis advantages in relation to direct esterification, because it is faster and can easily be followed by chromatography by gel permeation chromatography.

This invention also has as its object the applications of these oligomers with photocrosslinkable grafts in the fields of protective coating of metals and plastics, paper, inks, adhesives, and as crosslinking agents of various polymer matrices or varnishes (dentistry, composites . . . ) and as flexible inking buffers.

DETAILED DESCRIPTION OF THE INVENTION

This invention will be better understood from the following examples which illustrate but in no way limit it.

EXAMPLE 1

Free radical addition of thioglycolic acid on carboxytelechelic polybutadiene 2000×162 CTB HYCAR Characteristics of the initial polybutadiene:

The polybutadiene HYCAR 2000×162 CTB was an oligomer comprising a 1-2 unsaturation rate of 20% and a cis and trans 1-4 unsaturation rate of 80%. These characteristics were verified by proton nuclear magnetic resonance.

The number average weight (Mn) was 4400, which correspond to a chaining of about 80 units.

The reaction mixture was prepared in a 250-ml graduated flask into which were successively introduced 50 g of carboxytelechelic polybutadiene 2000×162, or 0.0114 mole, which correspond to 0.18 1-2 double bond equivalent, 20 g of thioglycolic acid or 0.2 mole; the ratio of thiol to 1-2 double bond therefore was close to 1.

The volume was then adjusted exactly to 250 ml by tetrahydrofuran. The mixture was homogenized in a Turbula, then introduced into a 500-ml three-neck round bottom flask equipped with a condenser, a thermometer and a system providing nitrogen bubbling and brought to 70° C., while deoxygenizing the solution. When the temperature was reached, 0.33 g of AIBN (azobisisobutyronitrile) or $2 \times 10^{-3}$ mole was introduced in the medium.

After four hours of reaction, the reaction mixture was evaporated in a Rotavapor at 140° C. for one hour to eliminate the solvent and residual thioglycolic acid.

Thioglycolic acid consumption was measured by gel permeation chromatography, from samplings made during the course of the reaction.

The addition rate was qualitatively evaluated by carbon-13 nuclear magnetic resonance and quantitatively by proton NMR.

$^{13}$C NMR: The initial polybutadiene spectrum made it possible to differentiate 1-2 unsaturation carbons at 114.2 and 142.6 ppm, cis and trans 1-4 carbons between 128.3 and 131.6 ppm.

The spectrum of the end product showed a considerable reduction of the intensity of the two bands due to 1-2 unsaturations, the 1-4 unsaturated multiplet remaining unchanged. An increase in intensity of a peak at 177 ppm, which corresponded to carbons carrying acid functions, was also observed.

$^1$H NMR: the spectrum showed first the reduction of the protons of vinyl groups —CH=CH$_2$ in relation to the initial polybutadiene. The method was the same and it sufficed to compare the integrations at 4.8-5 and 5.2-5.7 ppm.

The initial ratio of 20% 1-2 unsaturations became equal to 9%.

Further, the appearance was observed of a singlet at 3.2 ppm which corresponded to the CH$_2$ of the thioglycolic acid. This signal showed indeed that an added group was involved because in the free thio-containing compounds it appeared in the form of a doublet due to coupling through the S. Integration in relation to the unit confirmed the previously given rate of addition which corresponded to the rate of addition of the thiol on the 1-2 unsaturations of 50% and to a compound of the formula IV:

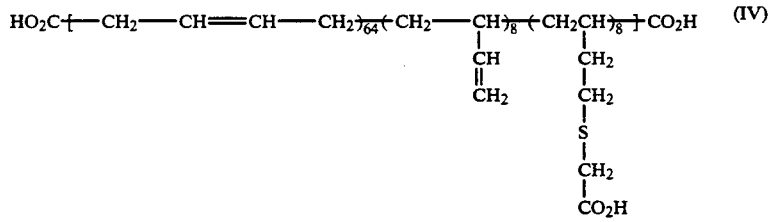

EXAMPLE 2

Photochemical addition of thioglycolic acid to polybutadiene 2000×162 CTB HYCAR

The polybutadiene having the same characteristics as in example 1 was used in this example.

The reaction mixture was prepared in a 50-ml quartz tube, in which were successively introduced: 11 g of polybutadiene or $2.5 \times 10^{-3}$ mole therefore 0.04 1-2 double bond equivalent, 4.5 g of thioglycolic acid or 0.04 mole. The thio 1-2 unsaturation ratio was close to 1:0.015 g of benzophenone or $8 \times 10^{-5}$. An amount of dichloromethane was added to provide, after stirring, a homogeneous solution (about 25 ml); a system providing nitrogen bubbling was adapted at the top of the tube, the mixture being magnetically stirred during the reaction. The tube was exposed for one hour to UV radiation from a Philips 125-W lamp, the unit being cooled by a continuous jet of compressed air.

After evaporation at 140° C. in the Rotavapor to eliminate the solvent and residual thio-containing compound, analysis of the end product was made.

The proton NMR spectrum, performed under conditions identical with those of example 1, made it possible to determine a rate of addition onto 1-2 double bonds equal to 50%; therefore compounds of the same structure IV as in example 1 were obtained.

EXAMPLE 3

Free radical addition of thioglycolic acid onto polybutadiene 2000×165 CTB HYCAR.

Characteristics of the initial polybutadiene:

The polybutadiene 2000×1654 CTB was an oligomer comprising an average 1-2 unsaturation rate of 20% and 1-4 cis and trans of 80%. The number average weight was 4000, which corresponded to a chaining of about 72 units.

The reaction mixture was prepared in a 250-ml graduated flask into which were successively introduced 50 g of polybutadiene 2000×165 CTB, or 0.0125 mole, therefore 0.19 1-2 double bond equivalent, 27 g of thioglycolic acid or 0.28 mole; the ratio of thio to 1-2 double bond therefore was close to 1.5.

The volume was then adjusted to 250 ml by tetrahydrofuran, stirred in the Turbula to be homogenized and introduced into a round bottom flask with three necks identical with the experimental protocol of example 1.

When a temperature of 70° C. was reached, there was added in the medium, 0.27 g of azobisisobutyronitrile, or $1.6 \times 10^{-3}$ mole. After eight hours of reaction, the mixture was purified by evaporation of the solvent in the Rotavapor then the vane pump for 2 h 30 min, $5.10^{-2}$ mm of mercury, at 60° C. Analysis of the proton NMR spectrum, performed under conditions identical with those of case No. 1 and 2, made it possible to determine a rate of addition on 1-2 unsaturations equal to 50%. The structure of the compound obtained corresponded to formula V below:

EXAMPLE 4

Free radical addition of thioglycolic acid onto polybutadiene 2000×165 CTB HYCAR.

An effort was made in this example to obtain an addition rate close to 100%.

To obtain this result, the thio ratio to the 1-2 unsaturation rate of the polybutadiene, was modified.

This ratio was taken as equal to 2, i.e., all other experimental conditions unchanged in relation to example 1:

50 g of polybutadiene 2000×165 CTB, or 0.18 double bond equivalent;

33 g of thioglycolic acid or 0.36 mole;

0.6 g of azobisisobutyronitrile or $0.36 \times 10^{-2}$.

The reaction was performed in tetrahydrofuran at 70° C. for four hours. Tracking by gel permeation chromatography showed an almost total disappearance of the thio-containing compound; carbon-13 NMR made it possible also to evaluate the very great reduction of peaks due to 1-2 C at 114.2 and 142.6 ppm, and proton NMR confirmed, by using the same technique as in the other examples, a rate of addition of thioglycolic acid on the double bonds close to 90%. The structure of the product was VI:

$$HO_2C\text{-}(CH_2\text{-}CH\text{-}CH\text{-}CH_2)_{57}\text{-}(CH_2\text{-}CH)_{7.5}\text{-}(CH_2\text{-}CH)_{7.5}\text{-}CO_2H$$

with side groups: CH=CH$_2$ ; CH$_2$-CH$_2$-S-CH$_2$-CO$_2$H

EXAMPLE 5

Free radical addition of 2-mercapto ethanol on hydroxytelechelic polybutadiene R45 of ARCO Characteristics of the initial product:

The polybutadiene HT R45 was an oligomer having a 1-2 unsaturation rate of 20% and 1-4 cis and trans unsaturation rate of 80%, verified by proton NMR.

The number average weight was 2800, which corresponded to a chaining of about fifty units.

As in example 4, a 100% addition rate was sought. The operating conditions were the following:

50 g of polybutadiene HT R 45 or 0.018 mole and 0.18 1-2 double bond equivalent.

28 g of 2-mercapto ethanol or 0.36 mole. The thio ratio on 1-2 double bond was equal to 2.

0.6 g of azobisisobutyronitrile or $3.6 \times 10^{-3}$.

The reaction in tetrahydrofuran was performed at 70° C. for four hours; as above, analysis of the proton NMR spectrum made it possible to confirm the addition rate.

The hydroxytelechelic polybutadiene exhibited, like the carboxytelechelic, peaks at 4.8-5 ppm (1-2 unsaturations), between 5.2 and 5.7 ppm (cis and trans unsaturations), at 2 ppm allyl protons and between 1.2 and 1.4 ppm protons of saturated CH$_2$ of the chain. Further, around 4 ppm there were observed protons of allyl CH$_2$-OH and around 3.5 ppm protons of nonallyl CH$_2$OH.

The 2-mercapto ethanol was present in the form of a triplet at 3.7 and a split triplet at 2.7 following the coupling with the proton of the SH.

When the thio-containing group is fixed on the polybutadiene, the superposition of the two preceding spectra was observed in regard to $CH_2OH$.

Only the $CH_2$ at alpha of the S, at 2.7 ppm passed in the form of a slightly modified triplet in chemical displacement.

This proton NMR study made it possible to compute the rate of addition of thio alcohol on the 90% 1-2 double bond, which gave structure VII:

$$HO\text{-}[(CH_2\text{-}CH=CH\text{-}CH_2)_{40}(CH_2\text{-}CH)_1(CH_2\text{-}CH)_{79}]\text{-}OH \quad (VII)$$

with pendant groups:
- CH=CH$_2$
- CH$_2$-CH$_2$-S-CH$_2$-CH$_2$-OH

Samplings taken during the reaction made it possible to follow the grafting of the glycidyl methacrylate by gel permeation chromatography.

The product was then analyzed by proton NMR. Actually, the presence of methacrylic groups was verified by peaks at 5.6 and 6.1 ppm corresponding to the two protons of the methacrylic double bond and, on the other hand, by the epoxide group $$CH_2\text{---}CH\text{---}CH_2\text{---} \atop \diagdown O \diagup$$

which gave three multiplets between 4 and 4.2 ppm (2H), at 3.2 ppm (1H) and between 2.5 and 3 ppm (2H). Comparison of the protons of the peak at 4.2 ppm and of the peak at 3.2 ppm of the grafted and ungrafted thioglycolic acid made it possible to evaluate the rate of grafting of the glycidyl methacrylate on the pendant acid groups.

In the present case, the rate of grafting obtained was 50%, which gave structure VIII:

$$HO_2C\text{-}[(CH_2\text{-}CH=CH\text{-}CH_2)_{64}(CH_2\text{-}CH)_4(CH_2\text{-}CH)_4(CH_2\text{-}CH)_8]\text{-}CO_2H$$

with pendant groups:
- CH$_2$-CH$_2$-S-CH$_2$-CO$_2$H
- CH$_2$-CH$_2$-S-CH$_2$-C(=O)-O-CH$_2$-CH(OH)-CH$_2$-O-C(=O)-C(CH$_3$)=CH$_2$
- CH=CH$_2$

EXAMPLE 6

50% grafting of glycidyl methacrylate on product IV.

Generally, these reactions were performed in a 1-liter inactinic round bottom flask, surmounted by a condenser, and immersed in an oil bath adjusted to 60° C.

There were introduced into the round bottom flask:
- 50 g of product IV or $10^{-2}$ mole, therefore $8 \times 10^{-2}$ acid equivalent;
- 5.7 g of glycidyl methacrylate or $4 \times 10^{-2}$ mole;
- 1.36 g of N,N dimethyl lauryl amine or $6 \times 10^{-3}$ mole hydroquinone in catalytic amount;
- 500 ml of tetrahydrofuran.

The mixture was homogenized in the Turbula before beginning the heating, and the reaction took place for 24 hours, then the solvent was evaporated in the Rotavapor then the vane pump ($5 \times 10^{-2}$ mm of mercury) at a temperature below 50° C.

EXAMPLE 7

100% grafting of glycidyl methacrylate on product IV.

There were introduced into the inactinic round bottom flask:
- 50 g of product IV or $10^{-2}$ mole, therefore $8 \times 10^{-2}$ acid equivalent;
- 11.5 g of glycidyl methacrylate or $8 \times 10^{-2}$ mole;
- 1.36 g of N,N dimethyl lauryl amine or $6 \times 10^{-3}$ mole;
- hydroquinone in catalytic amount;
- 500 ml of tetrahydrofuran.

After homogenization of the mixture in the Turbula, a protocol identical to that of example 6 was followed.

In this case, the proton NMR spectrum gave us a grafting rate close to 90% and the compound had to formula IX:

$$HO_2C\text{-}[(CH_2\text{-}CH=CH\text{-}CH_2)_{64}(CH_2\text{-}CH)_1(CH_2\text{-}CH)_7(CH_2\text{-}CH)_8]\text{-}CO_2H$$

with pendant groups:
- CH$_2$-CH$_2$-S-CH$_2$-CO$_2$H
- CH$_2$-CH$_2$-S-CH$_2$-C(=O)-O-CH$_2$-CH(OH)-CH$_2$-O-C(=O)-C(CH$_3$)=CH$_2$
- CH=CH$_2$

EXAMPLE 8

50% grafting of methacrylic acid on product VII.

This reaction was an esterification conducted in a solvent able to produce an azeotrope with water.

Into a 1-liter inactinic round bottom flask provided with an azeotropic distillation system were successively introduced: 50 g of product VII or 0.014 mole, therefore 0.13 alcohol equivalent; 11 g of methacrylic acid or 0.13 mole; 0.25 g of paratoluene sulfonic acid or $0.13 \times 10^{-2}$ mole; hydroquinone in catalytic amount; 250 ml of dichloromethane.

After 24 hours of reaction at 40° C., the solvent and residual methacrylic acid were evaporated in the Rotavapor and vane pump ($5 \times 10^{-2}$ mm of mercury) at 40° C. The evolution of the grafting rate during the reaction was followed by analysis of with gel permeation chromatography.

The final grafting rate was also computed by proton NMR and by gel permeation chromatography.

After 24 hours, a 50% rate of grafting was obtained for a compound of structure X:

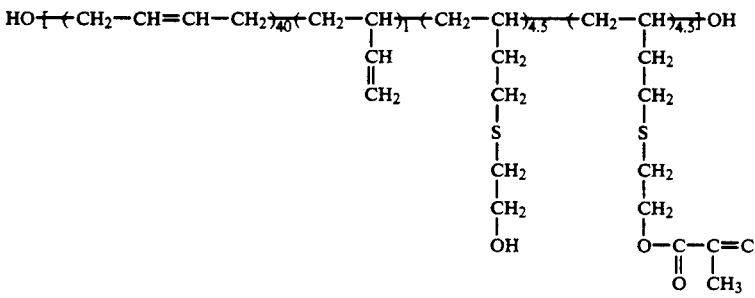

EXAMPLE 9

Application to the protection of metals

This invention also relates to the application of the oligomers claimed in examples 6, 7 and 8 and to any other oligomer coming from stage 3 of the process, and more particularly to their use in the field of protection of metals such as aluminum and its alloys. It was seen above that grafting of the acrylic functions related to a more or less large fraction of residual functions of thio-containing groups, added onto the 1-2 unsaturations of polydiene oligomers, so that acid, alcohol or free amine functions remained.

These functions have properties of adherence to various substrates.

Therefore it is desirable to use grafting rates limited to 50%.

Further, 1-4 unsaturation sequences impart properties of flexibility to the unit.

The typical formulation used comprises:
oligomer VIII: 55 parts by weight
ethylene glycol methacrylate: 45 parts of weight
photoinitiator DAROCUR 1173 acetophenone derivative of the formula

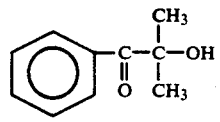

2 parts by weight.

Application to an aluminum plate of reference 8011 was made by a threaded rod of an applicator system to obtain a thickness of 10 micrometers. The latter was measured by a Permascope magnetic thickness gage.

After application of varnish, the plates were placed on a belt of a radiating machine, provided with two Philips HPM-15 lamps of 50 watts per centimeter. The passing speed of the belt was regulated to obtain, after radiation, plates dry to the touch, or a speed of 15 m/min.

To determine the qualities of the varnish, a series of tests was made on the plates thus prepared, whose results are carried in the table below:

| Test | Evaluation |
|---|---|
| Spreading | good |
| Behavior with methyl ethyl ketone back and forth number | >100 |
| Cross-cut test Standard DIN 531-51 | 5/5 |
| Scotch tape pull-off after cross-cut | 5/5 |
| Behavior to joule shock AFNOR T 30039 | very good up to 0.5 |
| Behavior with water 8 days at 37° C. | 4/5 |
| Adherence per cross-cut + Scotch after immersion in water at 37° C./8 days | 3/5 |

It should be noted that it was not possible, for lack of equipment, to check the shock for values greater than 0.5 joule, but for this value no peeling of the varnish was noted.

The foregoing description of the specific embodiments will so fully reveal the general nature of the invention that others can, by applying current knowledge, readily modify and/or adapt for various applications such specific embodiments without departing from the generic concept, and therefore such adaptations and modifications are intended to be comprehended within the meaning and range of equivalents of the disclosed embodiments. It is to be understood that the phraseology or terminology employed herein is for the purpose of description and not of limitation.

What is claimed is:

1. An oligomer with polydiene sequences and photocrosslinkable grafts, the repeating group having the formula:

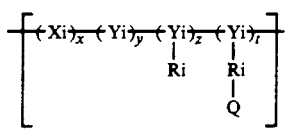

wherein:

Xi represents a diene monomer selected from the group consisting of isoprene, butadiene and chloroprene, polymerized according to a cis- or trans-1,4-chaining;

Yi represents a diene monomer selected from the group consisting of isoprene, butadiene and chloroprene, polymerized according to a 1,2- or 3,4-chaining;

Ri is a thio- or disulfide-containing radical having in the chain or on the end one or more $NH_2$, —OH, or —COOH groups;

Q is an acrylic or methacrylic derivative obtained by condensing acrylic acid, methacrylic acid, glycidyl acrylate, glycidyl methacrylate, aziridinyl acrylate or aziridinyl methacrylate with the $NH_2$, —OH, or —COOH group of Ri; and $x+y+z+t$ is less than or equal to 100;

z being from 1 to 20; and t being 0 or from 1 to 20.

2. An oligomer according to claim 1, wherein Ri is derived from a compound selected from the group consisting of 2-mercapto ethanol, thioglycolic acid, 2-mercapto ethanolamine, thiopropionic acid, thiomalic acid, and cysteine.

3. An oligomer according to claim 1 having terminal groups selected from —OH or —COOH.

4. An oligomer of the formula:

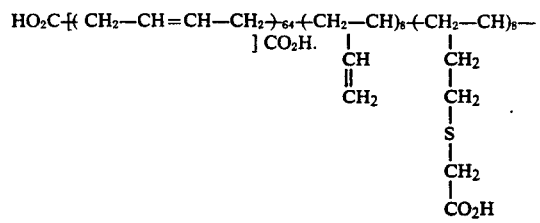

5. An oligomer of the formula:

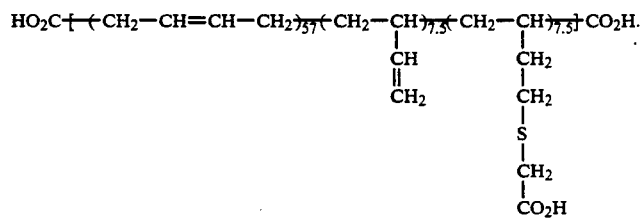

6. An oligomer of the formula:

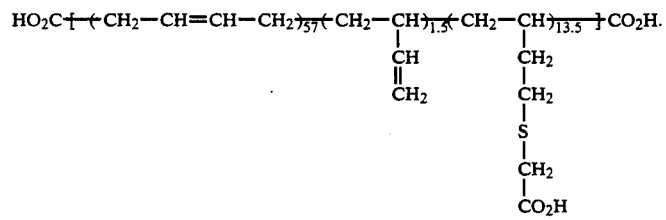

7. An oligomer of the formula:

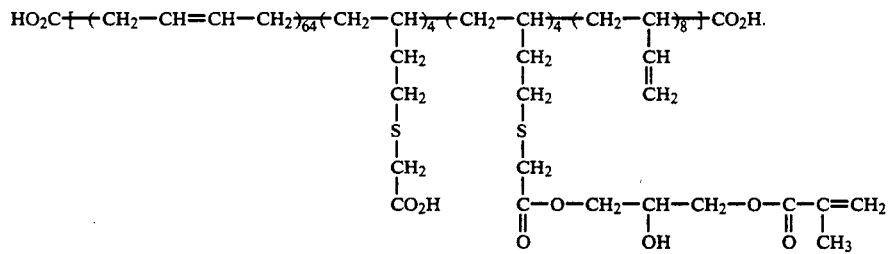

8. An oligomer of the formula:

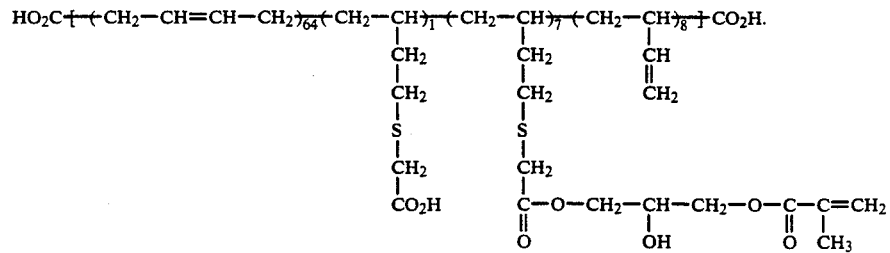

* * * * *